April 29, 1969     G. T. DUNN     3,441,341

EYEGLASS FRAME

Filed April 26, 1967

INVENTOR.
GRACE THOMPSON DUNN
BY Edward C. Threedy
HER ATTORNEY.

United States Patent Office 3,441,341
Patented Apr. 29, 1969

3,441,341
EYEGLASS FRAME
Grace Thompson Dunn, 2400 N. Lakeview Ave.,
Chicago, Ill. 60614
Filed Apr. 26, 1967, Ser. No. 633,845
Int. Cl. G02c 1/06, 5/02
U.S. Cl. 351—41     4 Claims

ABSTRACT OF THE DISCLOSURE

A frame for a single eye lens, including two nose bridges projecting laterally from either side of the single eyeglass frame for cooperating with temples or side pieces by which the eyeglass frame may be positioned over either of the eyes to either side of the nose of the user, the temples or side pieces preferably being of two-piece construction so that they may be retracted into a compact design easily carried in the pocket or purse.

---

The eyeglass of the invention comprises a frame for a single eye-piece having on either side thereof nose bridges and temples or side pieces.

The invention consists in the novel combination and arrangement of parts to be hereinafter described and claimed.

The invention will be best understood by reference to the accompanying drawings showing the preferred form construction, and in which.

Figure 1:
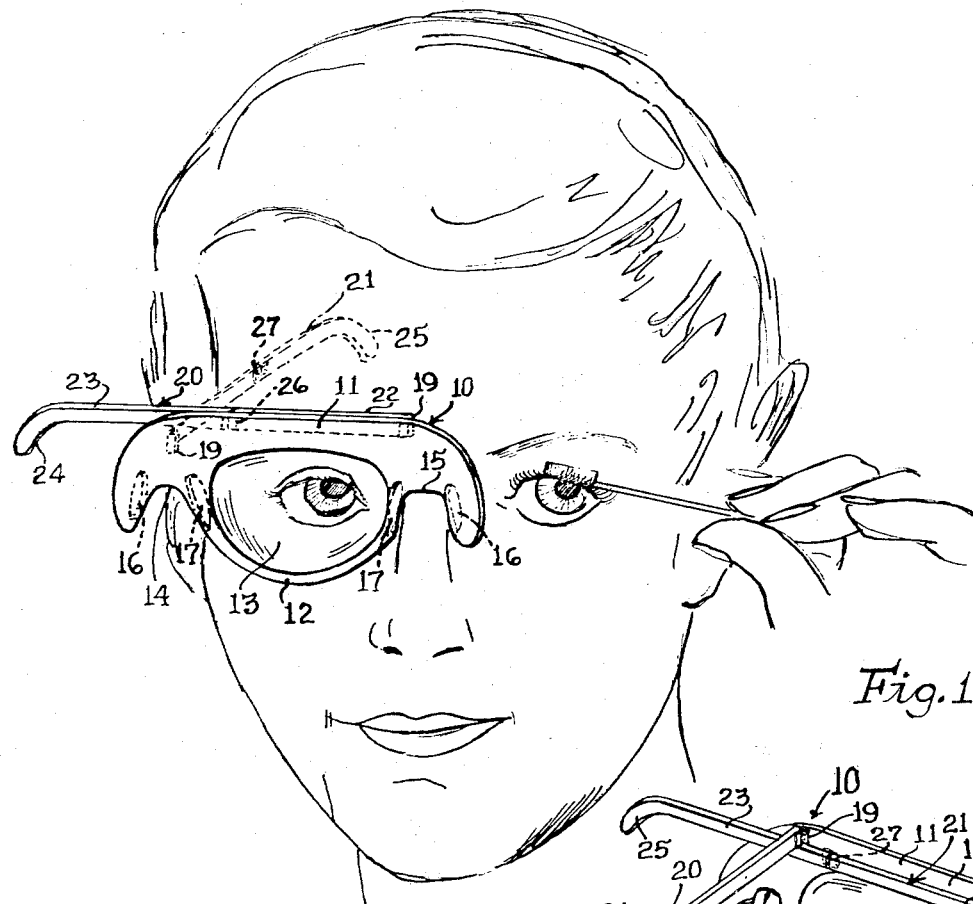
FIG. 1 is a perspective view of the improved eyeglass frame in use.

One of the stated objects of this invention is to provide a single eyeglass frame that may be worn over either eye, so as to leave the remaining eye uncovered and unobstructed. It will be apparent that the invention may be utilized in many industrial applications, such as by craftsmen whose work requires the presence of a magnifying glass or lens over but one eye during the performance of their work. Another important application of the invention is to permit the proper application of eye cosmetics or treatment of the eye or eyebrow, the use of the invention in such application being illustrated in FIG. 1.

Referring to the drawings, the improved eyeglass frame 10 includes an elongated upper body portion 11 provided with a depending medial loop member 12 which cooperates with the body portion 11 to form an opening for the reception and retention of a single eyeglass 13. The eyeglass 13 may be either in the form of a magnifying glass or a prescription lens as determined by the manufacturer and/or user of the device.

The elongated body 11 of the eyeglass frame 10 is provided with nose bridges 14 and 15 which are positioned to either side of the eyeglass 13. Each nose bridge provides guides 16 and 17 extending rearwardly of the body 11 of the eyeglass frame 10 and which are adapted to guide the frame onto the nose of the user as well as to retain the same in its position thereon.

Mounted on the rear face 18 of the body 11 of the frame 10 by means of suitable hinge structures 19 are a pair of temples 20 and 21. Each of the temples 20 and 21 are divided into two unequal sections 22 and 23. The sections 23 of each of the temples 20 and 21, respectively, terminate into an earpiece 24 and 25, respectively. Each of the sections 22 and 23 of the temples 20 and 21 are connected together by a hinge member 26 and 27 positioned on the inner surface of the sections so that they will not rest upon the side of the head of the user and will resist collapsing when the eye glass frame is in use in the manner shown in FIG. 1.

It should be noted that the temples 20 and 21 and their hinged connections 19 are arranged so that each of such temple bars are positioned above and in alignment with each of the nose bridges 14 and 15. This prevents either of the temples from interfering with the use of the eyeglass frame 10 as it is moved from one eye to the other.

Figure 2:
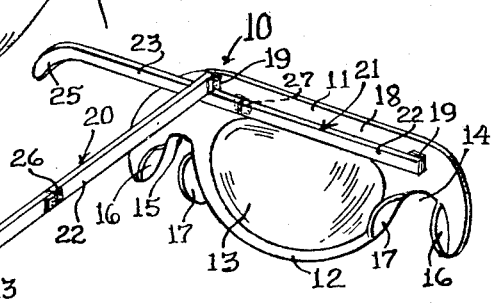
FIG. 2 is a perspective view of the eyeglass frame as seen from the rear.
Figure 3:
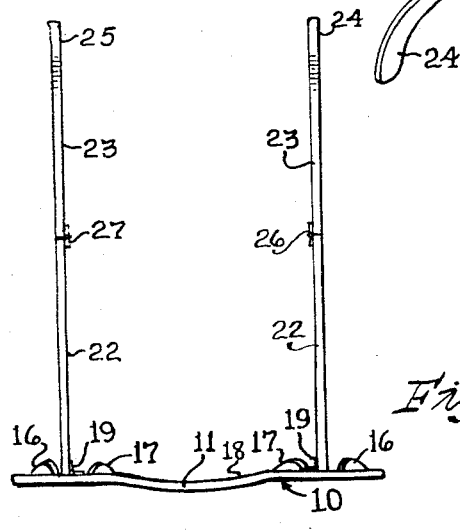
FIG. 3 is a top plan view of the improved eyeglass frame.

As shown in FIGS. 1 and 2, when the eyeglass frame 10 is in use, the temple which is not being utilized to cooperate with a nose bridge to hold the frame on the face of the user, is folded so as to lie parallel to the elongated body 11 of the frame 10 and to extend off to one side so as not to prevent the frame from being correctly positioned on the nose and relative to the eye which is to utilize the benefits of the glass 13.

As shown in FIG. 1, the improved eyeglass frame 10 is being used in the application of eye cosmetics. In this adaptation of the frame 10, it may be utilized to improve the vision of either eye, leaving both hands of the user free for the correct application of cosmetics, eye treatment, and the like. Heretofore it was required that a woman hold a manifying glass or an ordinary pair of spectacles in one hand so as to cover but one eye, while she endeavored to apply cosmetics or treatment to the other eye. As a result, most women requiring correcting lenses and using such lenses in an ordinary eyeglass frame found it impossible to correctly apply false eyelashes, mascara, or perform like cosmetic operations for themselves. My improved structure readily facilitates the use of both hands of the user for such purpose.

It is of course apparent that the eyeglass frame of this invention may be used by model makers, craftsmen, watchmakers, or for any other type of industrial use which requires the presence of an eyeglass over one or either eye of the user.

Figure 4:
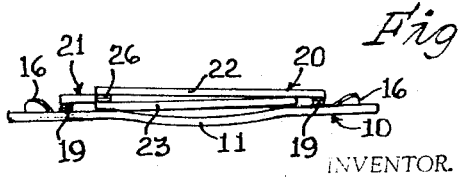
FIG. 4 is a top plan view of the eyeglass frame in its folded condition.

FIG. 4 depicts the improved eyeglass frame 10 in its collapsed or folded condition. In this respect the temples 20 and 21 are each folded so that their sections 22 and 23 thereof lie in facial parallel relation and with each of the folded sections being collapsed into a position rearwardly of the elongated body 11 and inwardly of each of the nose bridges 14 and 15.

Having thus described my invention, what I claim as new and desire to protect by Letters Patent is:

1. An eyeglass frame including
   (a) an elongated substantially flat body having a depending medial loop member providing a glass-receiving area,
   (b) means provided by said body on both sides of said glass-receiving area supporting one side of said frame on the bridge of the nose of the user,
   (c) elongated ear-embracing supports hingedly connected to one surface of said body above and centrally of said means formed on both sides of said glass-receiving area,
   (d) and means dividing each of said ear-embracing supports into sections foldable upon themselves and into collapsed position substantially parallel to the longitudinal length of said body when said eyeglass frame is not in use.

2. An eyeglass frame as defined by claim 1 wherein said means provided by said body on both sides of said glass-receiving area comprises identical nose bridges each including guide members for positioning the same upon the bridge of the nose of the user.

3. An eyeglass frame as defined by claim 1 wherein said elongated ear-embracing supports comprise temples hingedly connected to said body above and centrally of each of said nose bridges and cooperating with the same for positioning the same over either of said eyes of said user.

4. An eyeglass frame as defined by claim 1 wherein said means dividing each of said ear-embracing supports into sections comprises hinges which permit the free ends of said temples to be folded inwardly into a collapsed position substantially parallel to the other section of said temples and in a parallel relation with respect to said eyeglass frame when not in use.

References Cited

UNITED STATES PATENTS 1,936,319  11/1933  Wingate _____ 351—63
2,778,270  1/1957  Pomerance _____ 351—124 X DAVID SCHONBERG, Primary Examiner.

ROBERT L. SHERMAN, Assistant Examiner.

U.S. Cl. X.R.

351—63, 119, 124